United States Patent
McLoughlin et al.

(10) Patent No.: US 7,655,582 B2
(45) Date of Patent: Feb. 2, 2010

(54) POLYPROPYLENE BLENDS FOR NON-WOVEN FABRICS

(75) Inventors: Kimberly M. McLoughlin, Gibsonia, PA (US); Sehyun Kim, Murrysville, PA (US)

(73) Assignee: Sunoco Chemicals, Inc., Philadelphia, PA (US)

( * ) Notice: Subject to any disclaimer, the term of this patent is extended or adjusted under 35 U.S.C. 154(b) by 663 days.

(21) Appl. No.: 10/844,640

(22) Filed: May 12, 2004

(65) Prior Publication Data
US 2005/0255777 A1     Nov. 17, 2005

(51) Int. Cl.
B32B 5/26      (2006.01)
D04H 1/00      (2006.01)
D04H 1/56      (2006.01)
D04H 3/16      (2006.01)

(52) U.S. Cl. .................. 442/381; 442/327; 442/382; 442/400; 442/401; 428/373

(58) Field of Classification Search .................. 442/401, 442/400, 333, 381, 382; 525/240
See application file for complete search history.

(56) References Cited

U.S. PATENT DOCUMENTS

| | | | |
|---|---|---|---|
| 5,331,054 A * | 7/1994 | Fujita et al. | 525/240 |
| 5,460,884 A * | 10/1995 | Kobylivker et al. | 428/373 |
| 5,691,043 A | 11/1997 | Keller et al. | |
| 5,726,103 A | 3/1998 | Stahl et al. | |
| 5,763,080 A | 6/1998 | Stahl et al. | |
| 6,225,411 B1 | 5/2001 | Dang et al. | |
| 6,248,833 B1 | 6/2001 | Colucci et al. | |
| 6,309,736 B1 | 10/2001 | McCormack et al. | |
| 6,346,580 B1 | 2/2002 | Fujita et al. | |
| 6,437,048 B1 * | 8/2002 | Saito et al. | 525/240 |
| 6,444,774 B1 | 9/2002 | Stahl et al. | |
| 6,639,018 B2 | 10/2003 | Yunoki et al. | |
| 2003/0088022 A1 | 5/2003 | Lin et al. | |
| 2003/0176611 A1 | 9/2003 | Stevens et al. | |
| 2004/0041299 A1 | 3/2004 | Kim et al. | |

FOREIGN PATENT DOCUMENTS

| | | |
|---|---|---|
| EP | 0 482 918 | 4/1992 |
| EP | 0 812 371 | 12/1997 |
| WO | WO 2004/029341 A1 | 8/2004 |
| WO | WO 2004/029342 A1 | 8/2004 |

* cited by examiner

*Primary Examiner*—Lynda Salvatore
(74) *Attorney, Agent, or Firm*—Duane Morris LLP

(57) ABSTRACT

The present invention provides polypropylene blends for use in the production of fibers and fabrics. The polypropylene blends according to the current invention comprise from about 85 to about 95 percent by weight of a propylene homopolymer and from about 5 to about 15 percent by weight of an ethylene/propylene random copolymer having an ethylene content of about 7 percent by weight or less. The overall ethylene content of the blends according to the present invention is about 1 percent by weight or less. Polypropylene blends according to the current invention provide lower bonding temperatures and wider bonding windows without the increased smoke generation associated with high solubles homopolymers.

26 Claims, 8 Drawing Sheets

POLYPROPYLENE BLENDS FOR NON-WOVEN FABRICS

FIELD OF THE INVENTION

The present invention is related to the field of polypropylene compositions for use in the production of fibers and non-woven fabrics. More particularly, the present invention is related to the field of polypropylene blends containing ethylene that are useful in the production of fibers and non-woven fabrics.

BACKGROUND OF THE INVENTION

In the production of non-woven fabrics, such as spunbond and meltblown fabrics, molten polymer is extruded through a many holed die, or spinneret. The fibers are drawn by an air current and then collected in a random array to form a web of fibers. The web thus formed is then bonded by heating it to soften the polymer fibers and then passing the web through smooth or engraved calender rollers to bond the fibers. Bonding improves the strength of the non-woven fabric over non-bonded materials.

In many cases, the bonding process governs the speed at which a producer can run a line producing non-woven fabrics. The time that the web requires between the nips in the calendering process is controlled by the properties of the polymer in the fibers that make up the web, as well as the temperature and pressure of the calender rolls.

In certain applications it is desirable to combine one or more webs of non-woven fabric. Typical constructions of this type combine one or more webs of spunbond fabric with a web of meltblown fabric. Such constructions are termed spunbond-meltblown (S-M) and spunbond-meltblown-spunbond (S-M-S) fabrics. A problem arises in the bonding process for such constructions stemming from the relatively high temperatures needed to bond the spunbond material. These temperatures may cause partial melting of the much finer fibers that make up the meltblown web, resulting in pinholes which compromise the barrier properties of the fabric.

It is known that a PP having a high level of solubles can improve process performance in non-woven fabrics, providing lower bonding temperatures and a wider bonding window. It is, however, a burden to PP manufacturers to produce high solubles because large amounts of unwanted wide-spec materials are generated to reach targeted high solubles. Also, it is known that the solubles are responsible for smoke generation during fiber spinning.

It would therefore be desirable to provide a polypropylene material that provides the wide bonding window and low bonding temperatures of a high solubles material without the drawbacks of large amounts of off-spec material and increased smoke generation in processing.

SUMMARY OF THE INVENTION

The present invention provides novel polypropylene blends for use in fiber and non-woven fabric production. The polypropylene blends according to the current invention comprise from about 80 to about 95 percent by weight of a propylene homopolymer having a decalin solubles content of about 4 percent by weight or less, preferably from 2 percent by weight to about 4 percent by weight, and from about 5 to about 20 percent by weight of an ethylene/propylene random copolymer. The polypropylene blends have a total ethylene content of about 1 percent by weight or less, and a decalin solubles content of about 6 percent by weight or less.

The ethylene/propylene random copolymers used in the polypropylene blends according to the current invention preferably have an ethylene content of about 7 percent by weight or less.

Blending of the propylene homopolymer and ethylene/propylene random copolymer can be accomplished either by in-reactor blending, using sequential polymerization reactors, or by mechanical blending of materials in an extruder.

The polypropylene blends according to the current invention preferably have a melt flow index (MFI), measured in dg/min at 230° C., which is suitable for spunbond fiber processing. Material having the appropriate melt flow index for spunbond processing can be produced either in-reactor by known techniques, or by controlled degradation of a low melt flow index material according to the current invention.

DETAILED DESCRIPTION OF THE INVENTION

Figure 2:
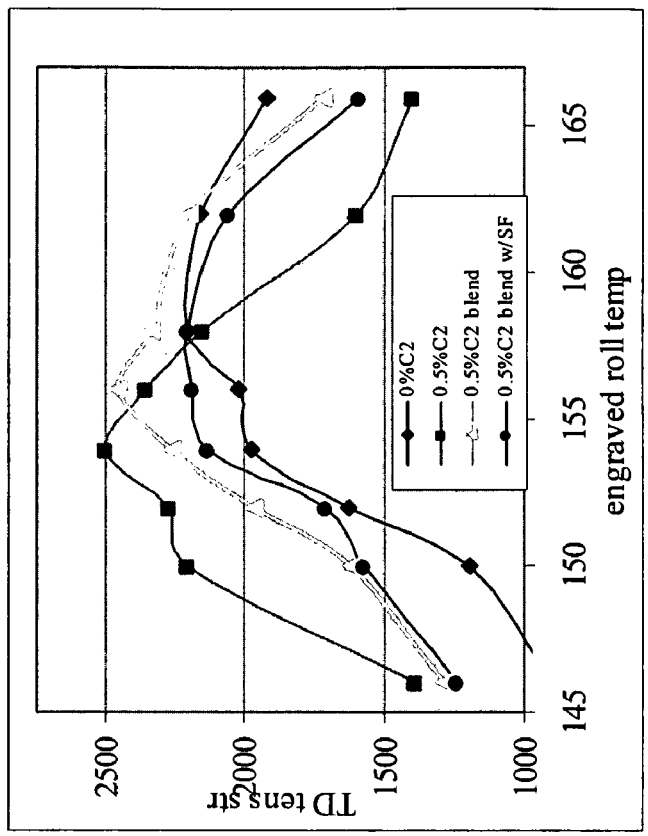
FIG. 2 Is a line graph showing the transverse direction tensile strength of non-woven fabrics at various bonding temperatures.

The polypropylene blends according to the current invention are suitable for use in spunbond, and combination spunbond-meltblown non-woven fabrics. Particularly, the polypropylene blends according to the current invention are useful in multilayer fabrics such as spunbond-meltblown (S-M), and spunbond-meltblown-spunbond (S-M-S) constructions.

It has been found that the incorporation of minor amounts of ethylene in a spunbond fabric allows for bonding of the fibers at lower calender temperatures without significantly compromising the strength of the resulting fabric. The inventors postulate that alternatively, higher line speeds may be obtained at a given temperature and pressure, allowing producers to achieve higher throughput on equipment without compromising fabric strength. Further, the bonding window obtained with materials having minor amounts of ethylene incorporated according to the current invention is comparable to that obtained with standard propylene homopolymers used in fiber production.

Achieving lower bonding temperatures is important in making fabric constructions that contain both spunbond and meltblown webs, such as S-M-S constructions for medical and hygiene applications. Bonding those types of constructions requires calender heating that effectively bonds the spunbond fabric without overheating the meltblown web, since overheating causes voids that destroy the barrier properties of the meltblown web. Reducing the calender temperature needed for the spunbond web can help processors to achieve this balance.

It has been found that introduction of about 1 percent or less by weight of ethylene via blending of an ethylene/propylene random copolymer with a propylene homopolymer provides the best fabric strength at a given calendering temperature. Accordingly, the polypropylene blends according to the current invention comprise from about 80 to about 95 percent by weight of a propylene homopolymer and from about 5 to about 20 percent by weight of an ethylene/propylene random copolymer.

The propylene homopolymers used in the blends according to the current invention have a decalin soluble content of about 4 percent by weight or less, preferably from 2 percent by weight to about 4 percent by weight. The polypropylene blends according to the current invention have a total decalin solubles content of about 6 percent by weight or less. Incorporation of an ethylene/propylene random copolymer into polypropylene for spunbond and meltblown fabrics allows resin manufacturers to avoid the problems associated with producing high solubles content polypropylene for fiber processing.

The ethylene/propylene random copolymers used in the blends according to the current invention have an ethylene content of about 7 percent by weight or less, preferably from about 2 to about 3 percent by weight. The polypropylene blends according to the current invention have a total ethylene content of about 1 percent by weight or less, preferably about 0.5 percent by weight or less.

The polypropylene blends according to the current invention preferably have a melt flow index (MFI), measured in dg/min at 230° C. that is suitable for spunbond fiber processing. Suitable melt flow indices for spunbond fiber processing range from about 8 dg/min to about 55 dg/min. Polypropylene blends according to the current invention having a suitable melt flow index for spunbond fiber processing can be obtained by using known methods to produce a reactor material of the proper melt flow index. Alternatively, a low melt flow index material according to the current invention may be produced and then adjusted using controlled rheology techniques to produce a final material having a melt flow index suitable for spunbond processing. Further, it will be recognized that controlled rheology materials may be pelletized for shipment to processors, or the controlled rheology treatment may be completed by a processor directly prior to fiber production. It will be recognized by those of ordinary skill in the art that the present invention is not limited to a particular melt flow index range or means of achieving a particular melt flow index.

EXAMPLES

Samples of polypropylenes for production of spunbond fabrics were produced by extruding each of the powder samples described in Table I with 1000 ppm Irganox 1076 m, 500 ppm Irgafos 168, 300 ppm calcium stearate, and sufficient Trigonox 101 peroxide to yield a pellet MFI of approximately 25 dg/min. Two 0.5% ethylene blends (2 and 12 initial MFI) were produced by dry-blending a 2.5% ethylene content random copolymer (RCP) with a propylene homopolymer (HPP) powder prior to extruding with peroxide and additives. Another 0.5% ethylene blend was produced by dry-blending a 3.5% ethylene random copolymer with the same propylene homopolymer powder prior to extruding with peroxide and additives. Also tested were a polypropylene homopolymer, a 0.5% ethylene mini-random copolymer (mRCP), and a 2.5% ethylene random copolymer.

TABLE I

Resins used for Random Copolymer Spunbond Studies

| Sample | resin Type | powder MFI | wt. % decalin solubles | wt. % ethylene RCP | wt. % ethylene blend | pellet MFI |
|---|---|---|---|---|---|---|
| A | HPP | 2.7 | — | — | — | 26 |
| B | mRCP | 3.1 | 3.4 | 0.5 | — | 28 |
| C | 20% RCP | 2 | 4.6 | 2.5 | 0.5 | 27 |
| D | 20% RCP | 12 | 7.5 | 2.5 | 0.5 | 27 |
| E | 100% RCP | 12 | 9 | 2.5 | — | 27 |
| F | 14% RCP | 2 | 7.8 | 3.5 | 0.5 | 26 |

Fabrics were produced on a ST&CC Reifenhauser Reicofil II spunbond line using a 2734 hole, 0.6 mm capillary diameter spinneret. Extruder and die temperatures were set to achieve a nominal melt temperature of 235° C. The target throughput was 0.65 ghm. Suction and cooling fans speeds were held at 2200 and 1700 rpm, respectively, to achieve a target denier of about 2.9 g/9000 m. Bond curves were measured for 30 gsm fabric samples collected at a series of calender roll temperatures. The calender temperatures were selected based on the ethylene content of the resin, as shown in Table II. (As usual, the smooth calender roll was set 5° C. cooler than the engraved roll.)

TABLE II

Calender Temperature Settings

| C2 Content (wt. %) | engraved roll temps (° C.) | | | | | | | |
|---|---|---|---|---|---|---|---|---|
| 0 | 146 | 150 | 152 | 154 | 156 | 158 | 162 | 166 |
| 0.5 | 146 | 150 | 152 | 154 | 156 | 158 | 162 | 166 |
| 2.5 | 132 | 136 | 138 | 140 | 142 | 144 | 148 | 152 |

As shown in Table III, filament diameters are very consistent among all fabrics produced here, as measured by microscope observation of fabrics. Since fan speeds were held constant, this result indicates that neither ethylene content nor initial powder MFI significantly affected the resistance to draw force for this set of polymers. These results suggest that a mini-random copolymer or HPP/RCP blend containing a standard spunbond additive package could be processed using with the same spinning conditions that would be used for a HPP of the same MFI.

TABLE III

Filament Deniers Measured on Spunbond Fabrics

| | Sample | | | | | |
|---|---|---|---|---|---|---|
| | A | B | C | D | E | F |
| ethylene content (wt. %) | 0 | 0.5 | 0.5 | 0.5 | 2.5 | 0.5 |

TABLE III-continued

Filament Deniers Measured on Spunbond Fabrics

| | Sample | | | | | |
|---|---|---|---|---|---|---|
| | A | B | C | D | E | F |
| powder MFI (dg/min) | 2.7 | 3.1 | 2 | 12 | 12 | 2 |
| denier | 2.8 | 3.0 | 2.8 | 2.8 | 3.0 | 2.9 |

Figure 1:
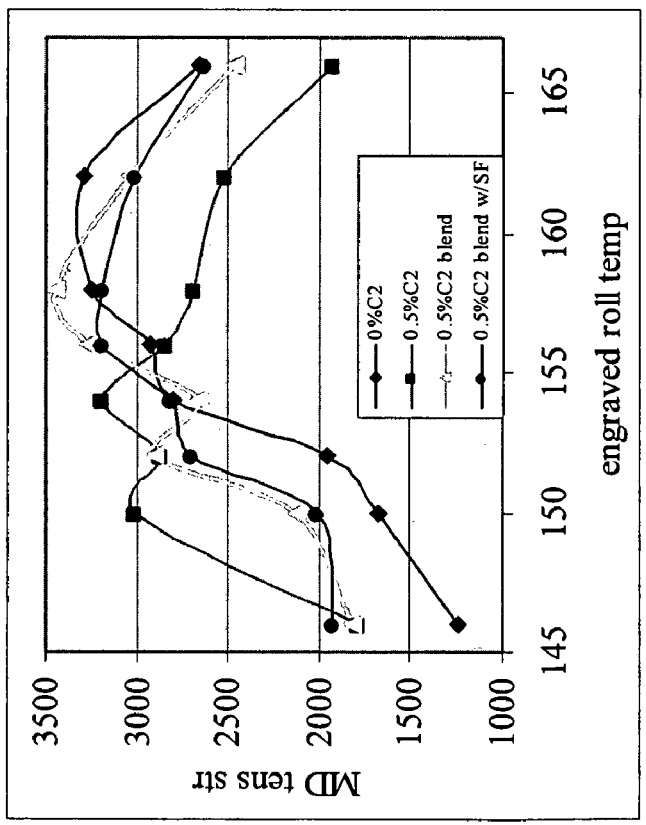
FIG. 1 Is a line graph showing the machine direction tensile strength of non-woven fabrics at various bonding temperatures.

Bond curves for the materials cracked from 2-MFI powders are shown in FIGS. 1 and 2. The fabrics made from RCP and RCP blends all exhibit higher tensile strength at lower calender temperatures than the homopolymer. The mRCP (labeled 0.5% $C_2$) has a significantly lower optimal bond temperature than the HPP. Its maximum machined direction (MD) tensile strength is measured at 154° C., compared to 162° C. for the HPP. The 0.5% ethylene RCP blends have optimal bond temperatures that fall between those of the mRCP and the HPP.

Figure 3:
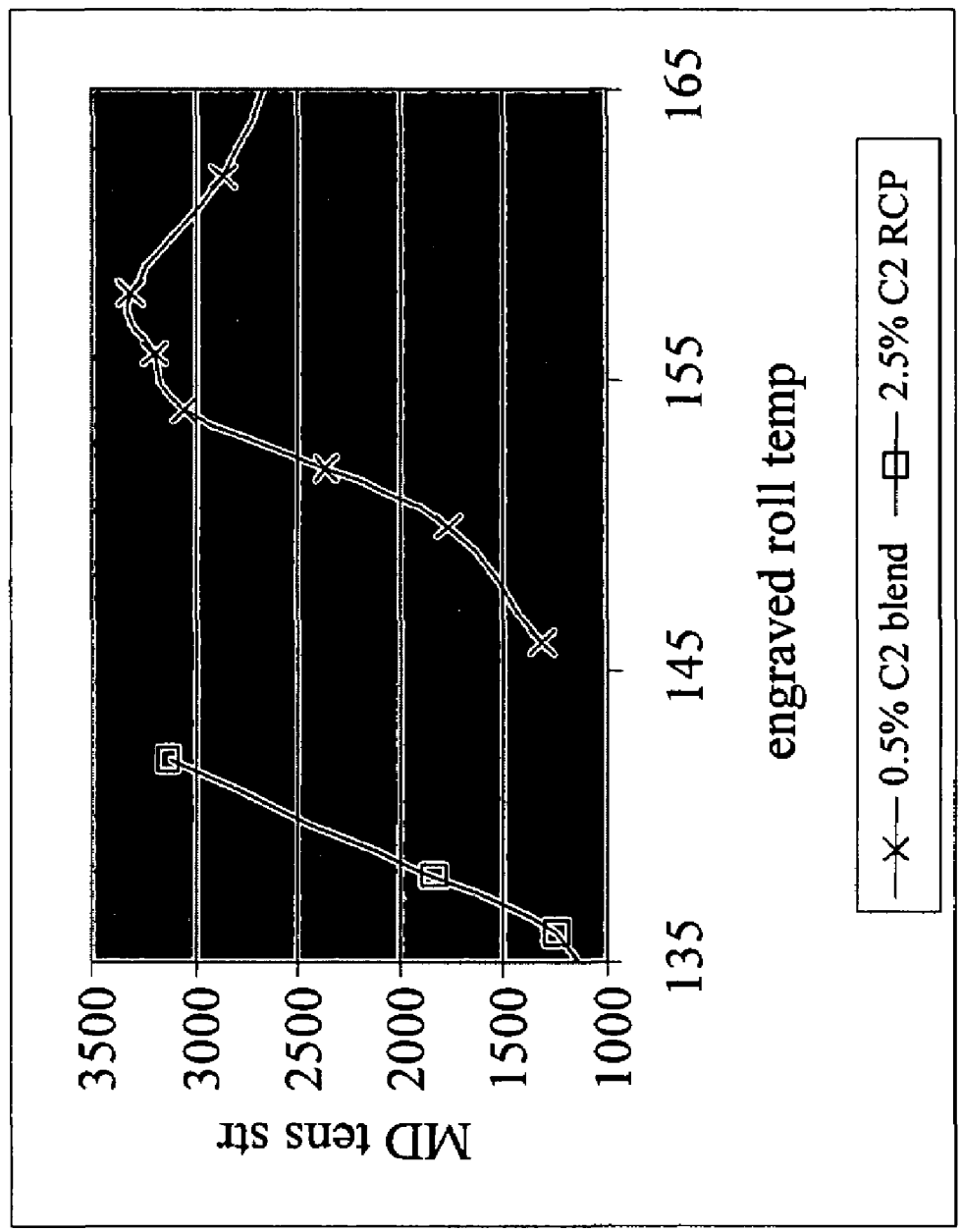
FIG. 3 Is a line graph showing the machine direction tensile strength of non-woven fabrics at various bonding temperatures.
Figure 4:
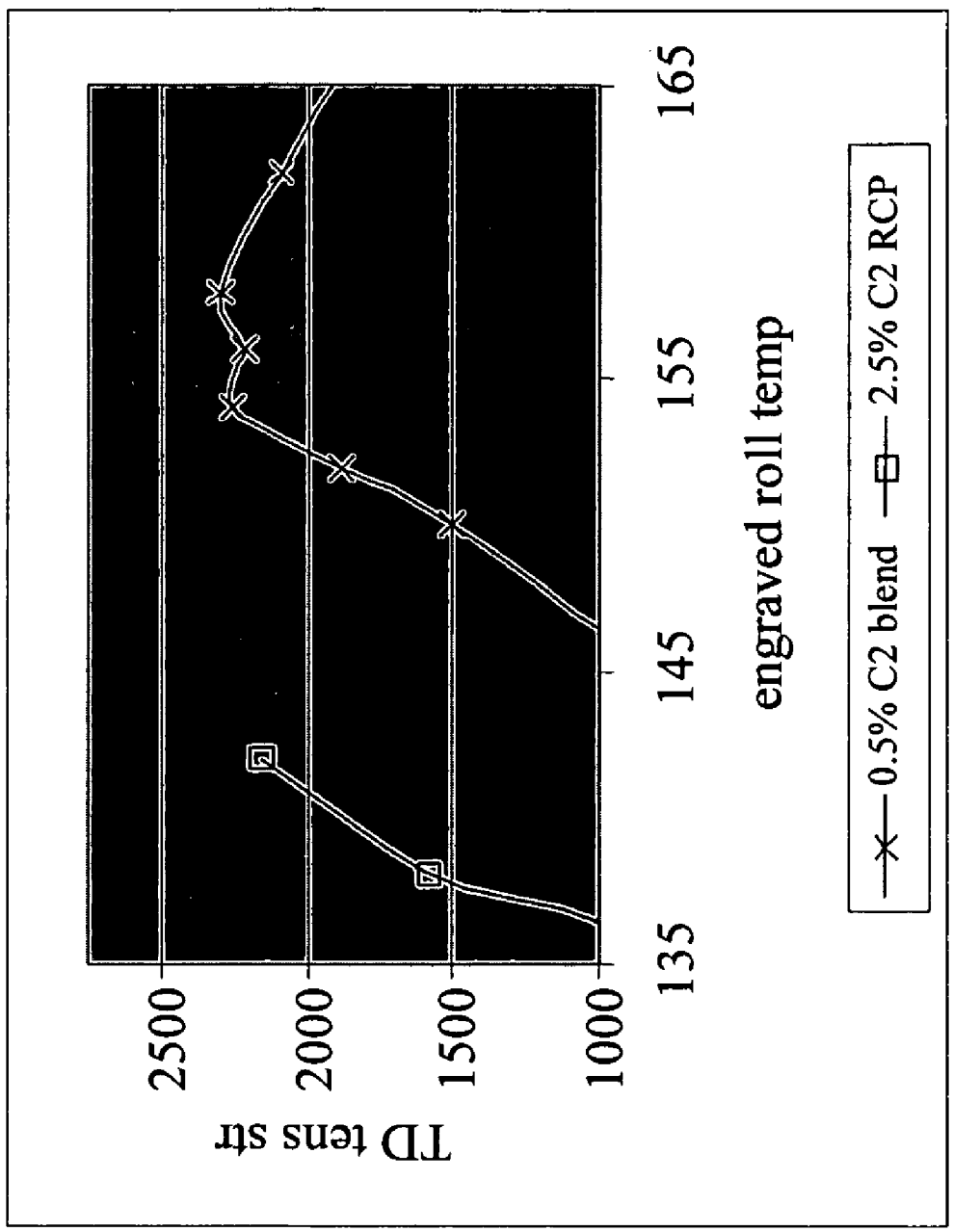
FIG. 4 Is a line graph showing the transverse direction tensile strength of non-woven fabrics at various bonding temperatures.

Bond curves for the grades cracked from 12-MFI powders are shown in FIGS. 3 and 4. Over the range of calender temperatures used here, no optimal bonding temperature was observed for the 2.5% ethylene content RCP. However, RCP fabrics that were made using calender temperatures much lower than those typically used for HPP fabrics had strength roughly equivalent to the maximum HPP fabric strength. A 2.5% ethylene content RCP bonded at 142° C. had MD and transverse direction (TD) tensile strength values nearly identical to those of an HPP bonded at 162° C.

The bonding windows of the RCP/HPP blends are somewhat broader than the bonding window of the mRCP and somewhat narrower than the bonding window of the HPP. Bonding window is defined here as the range of calender temperatures over which the HPP control exhibits tensile strength at least 90% as high as the maximum. For the results reported in FIG. 1, the bond window is the range of temperatures over which a sample had an MD tensile strength of at least 3000 g. Using that definition, the bonding windows measured for each of the samples cracked from 2 MFI are reported in Table IV. Both of the RCP/HPP blends have bonding windows about 2° C. broader than the mRCP and about 2° C. narrower than the HPP.

TABLE IV

Bonding Windows

| Sample | Bond Temp Range (° C.) | Bond Window Width (° C.) |
|---|---|---|
| HPP | 156.5-164 | 9.5 |
| 0.5% mRCP | 150-155 | 5 |
| 0.5% blend with 2.5% RCP | 155-162 | 7 |
| 0.5% blend with 3.5% RCP | 155-162 | 7 |

Figure 5:
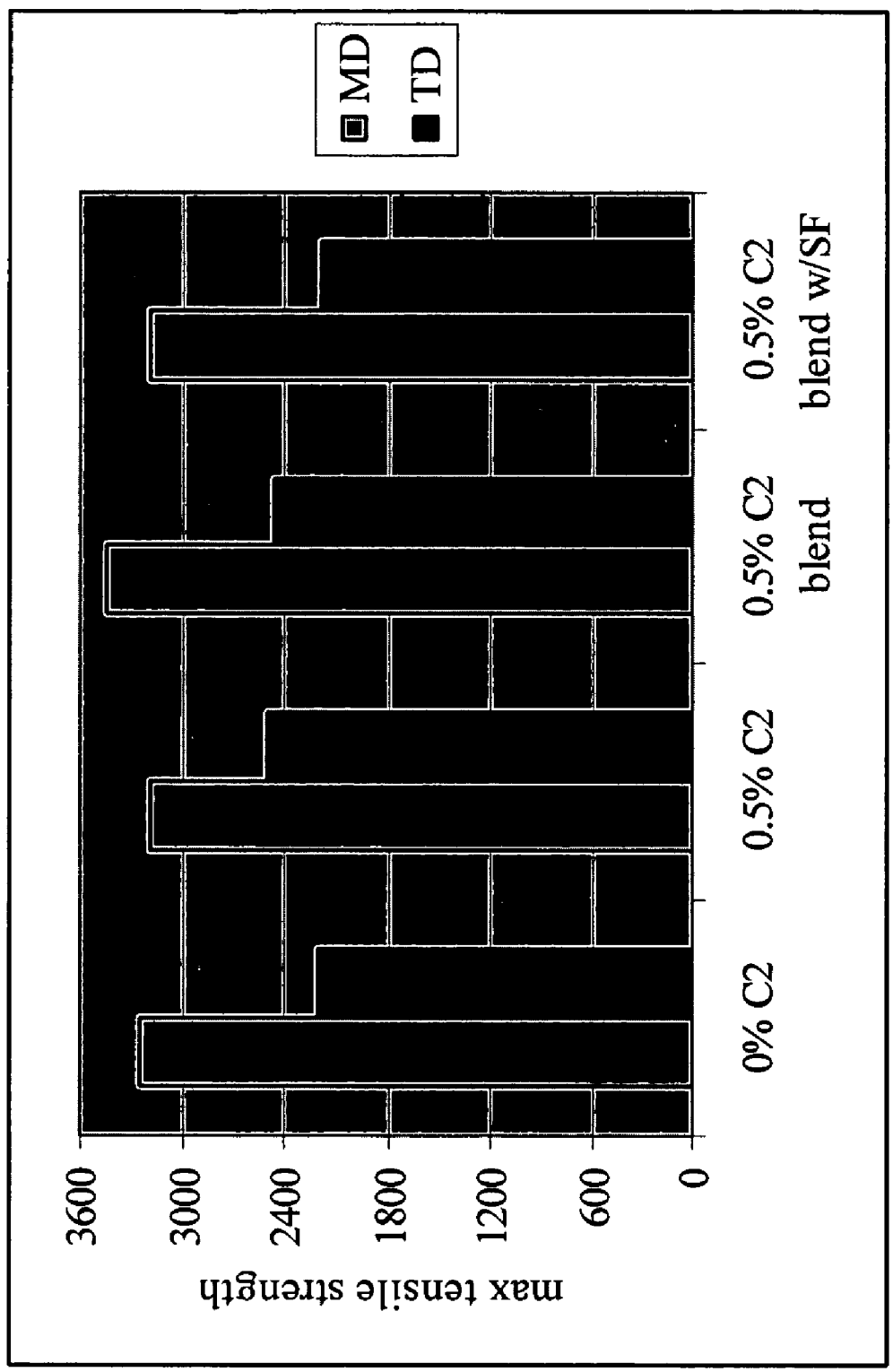
FIG. 5 Is a bar graph showing the maximum machine and transverse direction tensile strength of non-woven fabrics.

As shown in FIG. 5, maximum MD tensile strength is fairly consistent among all four polymers. Maximum TD tensile strength is 10-15% higher for an mRCP and a 0.5% ethylene blend than for the HPP or for the blend containing the high-ethylene RCP.

Figure 6:
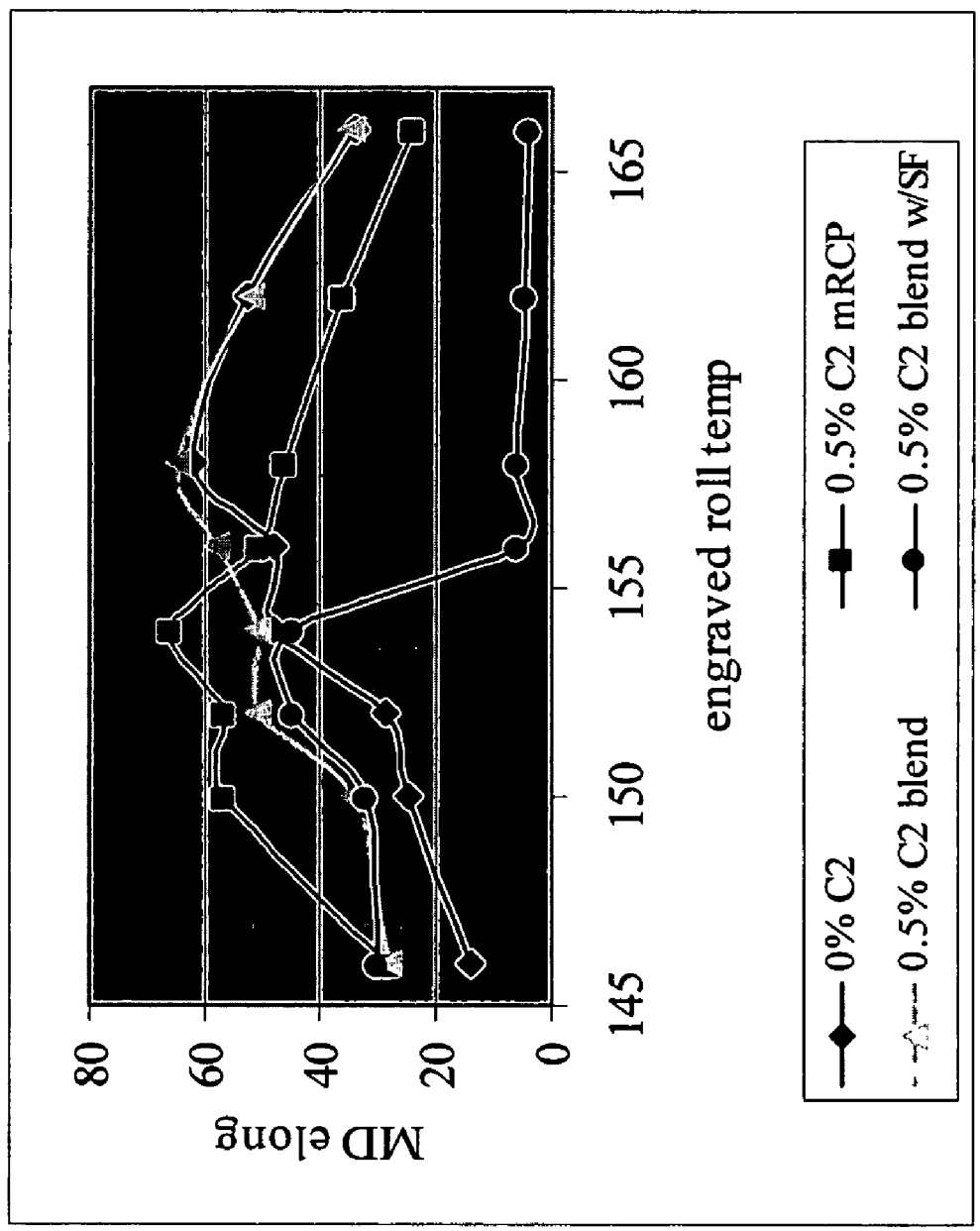
FIG. 6 Is a line graph showing the machine direction elongation of non-woven fabrics at various bonding temperatures.
Figure 7:
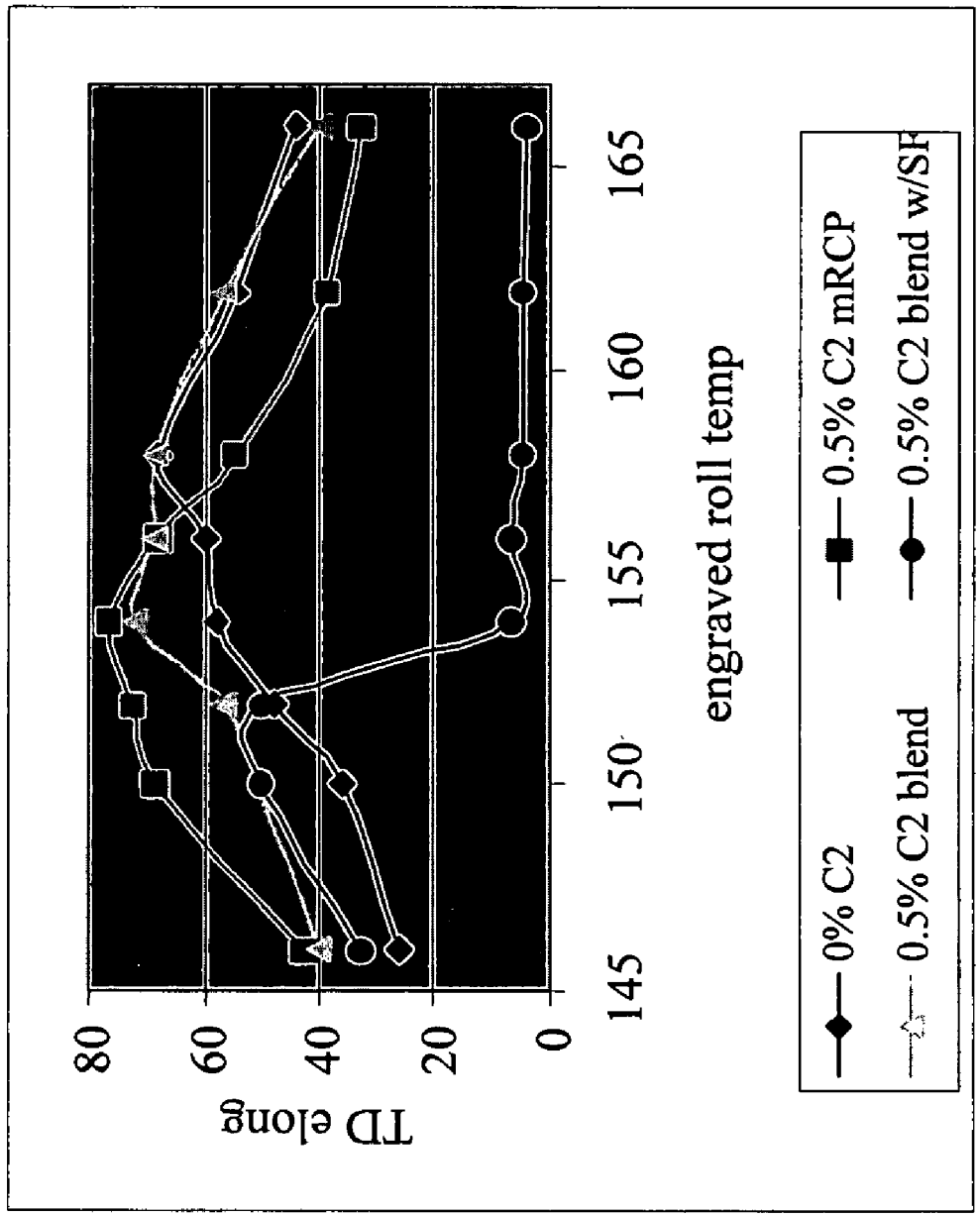
FIG. 7 Is a line graph showing the transverse direction elongation of non-woven fabrics at various bonding temperatures.

It has also been found that incorporation of ethylene according to the current invention does not adversely impact fabric elongation. In fact, as shown in FIGS. 6 and 7, the mRCP and blends containing 0.5% ethylene had elongation at break values very similar to those of the HPP control. Conversely, the fabrics produced from 2.5% ethylene random copolymers have break elongations that are much lower than those for HPP fabrics. The 2.5% ethylene RCP had elongation at break lower than 10% for each of the calender temperatures in this study. The blends containing the 3.5% ethylene RCP had elongation similar to those of the other RCP's and the HPP at lower calender temperatures. However, at higher calender temperatures, their elongation values dropped to below 10%.

Figure 8:
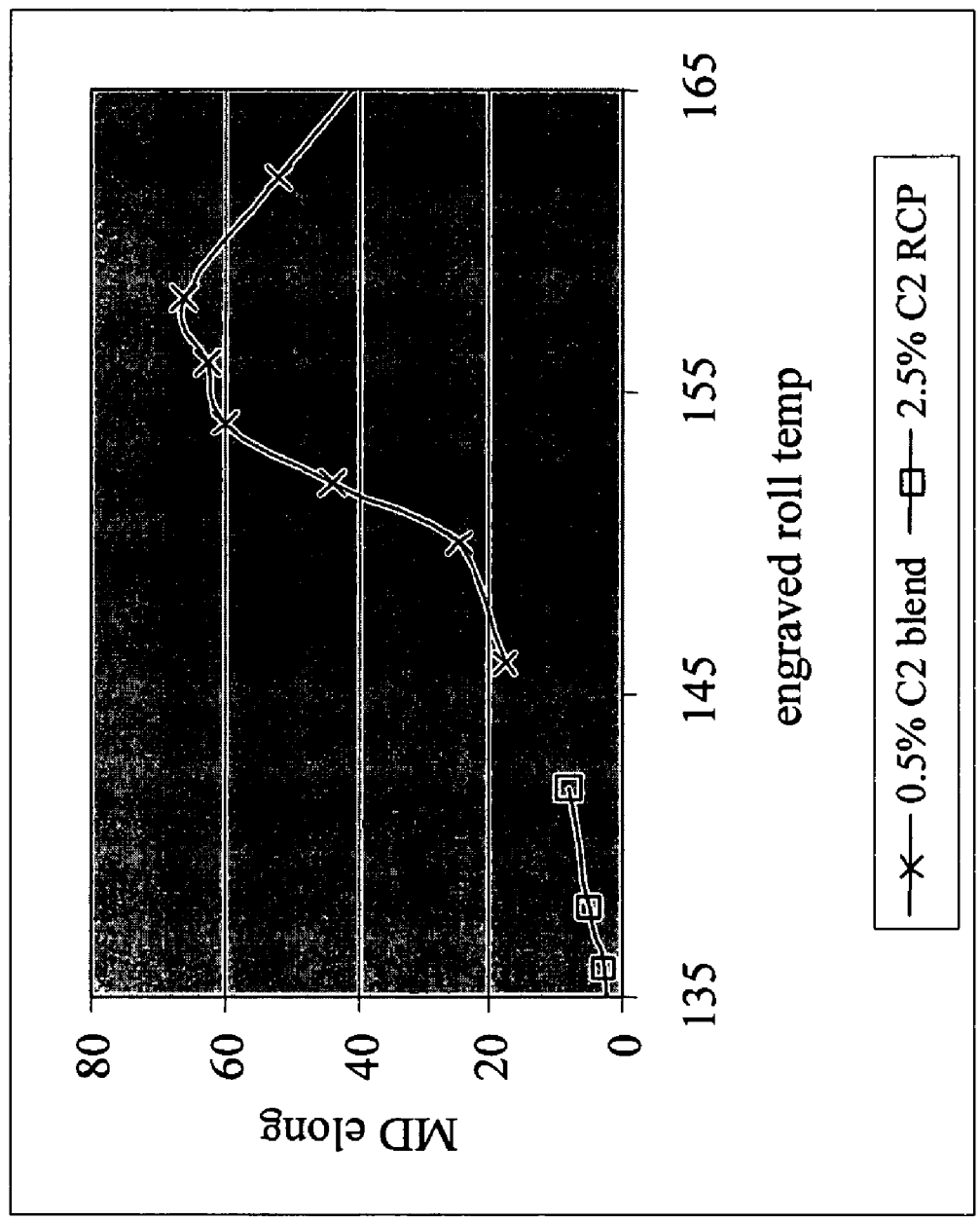
FIG. 8 Is a line graph showing the machine direction elongation of non-woven fabrics at various bonding temperatures.
Figure 9:
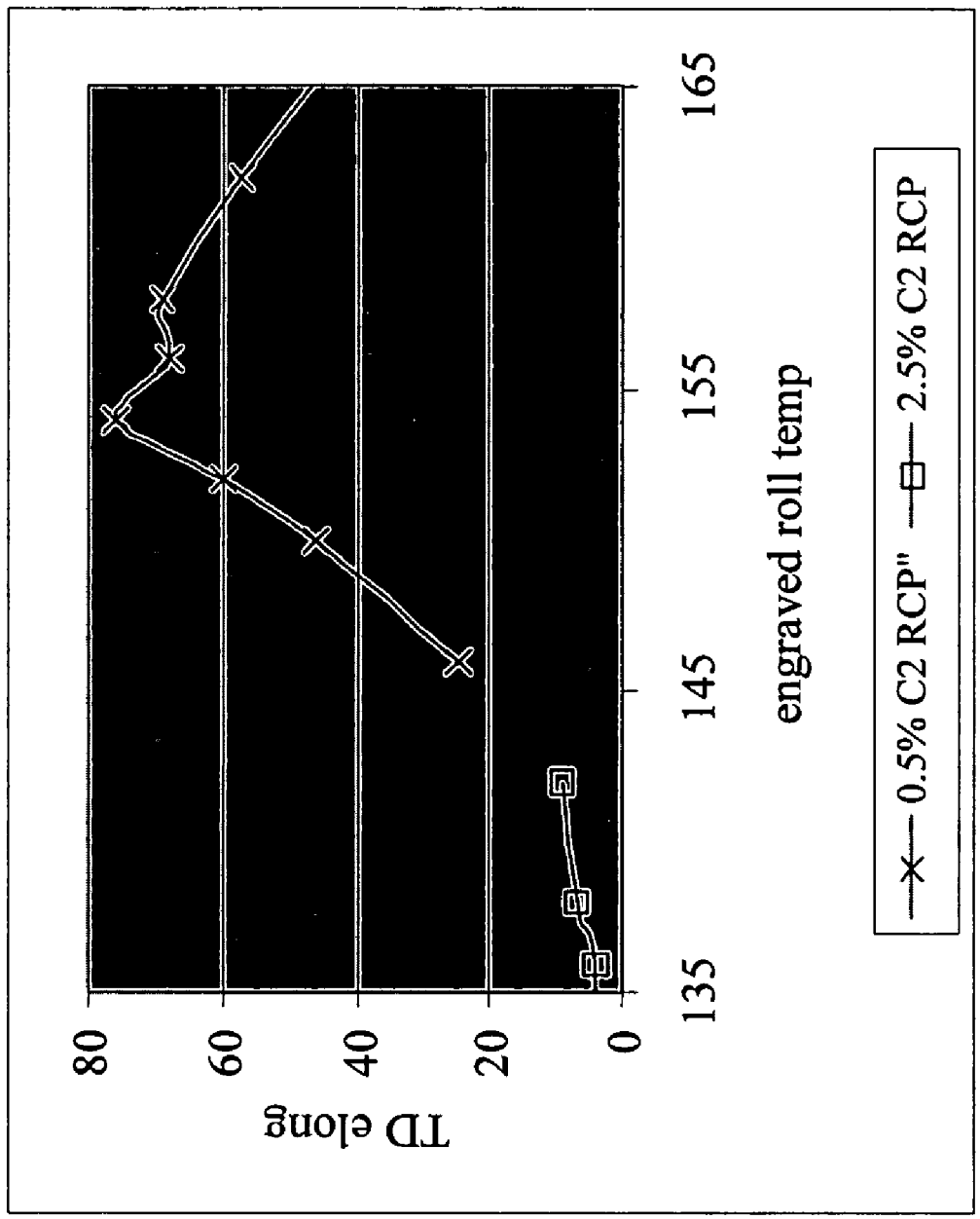
FIG. 9 Is a line graph showing the transverse direction elongation of non-woven fabrics at various bonding temperatures.

As shown in FIGS. 8 and 9, the break elongations of the 2.5% ethylene RCP fabrics are significantly lower than that of the HPP or the 0.5% ethylene fabrics. At each of the calender temperatures tested here, the break elongation was less then 10%.

It has thus been shown that polypropylene blends produced according to the current invention can be used in the production of non-woven fabrics at standard conditions without compromising the strength of the fabric produced compared to standard propylene homopolymers. This allows manufacturers to obtain the same performance obtained with propylene homopolymers without the problems inherent in producing high solubles homopolymers and the smoke generation associated with fiber production using high solubles materials.

It will also be appreciated that the properties of the polypropylene blends according to the current invention will allow the use of lower processing temperatures. Alternatively, it may be possible for manufacturers to use higher line speeds on a non-woven processing line at a given temperature without compromising fabric strength, thus allowing producer to achieve higher throughput on a given line.

The use of lower processing temperatures is a benefit in the production of multilayer S-M and S-M-S constructions where preserving the barrier properties of the meltblown web in the construction is important.

Thus some of the benefits of the instant invention have been outlined broadly. However, additional benefits of the current invention will be apparent to those having skill in the art. The full scope of the invention will be understood by the appended claims.

What is claimed is:

1. A polypropylene composition comprising:
   from about 80 to about 95 percent by weight of a propylene homopolymer, said propylene homopolymer having a decalin solubles content of about 4 percent by weight or less; and
   from about 5 to about 20 percent by weight of an ethylene/propylene random copolymer, said ethylene/propylene random copolymer having an ethylene content of about 7 percent by weight or less;
   said propylene composition having a total ethylene content of about 1 percent by weight or less, and a decalin solubles content of about 6 percent by weight or less.

2. The polypropylene composition according to claim 1, wherein said ethylene/propylene random copolymer has an ethylene content of from about 2 to about 3 percent by weight.

3. The polypropylene composition according to claim 1, wherein said propylene homopolymer has a decalin solubles content of from about 2 to about 4 percent by weight.

4. The polypropylene composition according to claim 1, wherein said polypropylene composition has a melt flow index of from about 8 to about 55 dg/min at 230° C.

5. The polypropylene composition according to claim 4, wherein said polypropylene composition is visbroken from a material having a melt flow index of less than 12 dg/min at 230° C.

6. The polypropylene composition according to claim 1, wherein said polypropylene composition is produced by in-reactor blending.

7. The polypropylene composition according to claim 1, wherein said polypropylene composition is produced by melt blending a propylene homopolymer with an ethylene/propylene random copolymer.

8. A non-woven fabric comprising:
a polypropylene composition comprising from about 80 to about 95 percent by weight of a propylene homopolymer, said propylene homopolymer having a decalin solubles content of about 4 percent by weight or less; and
from about 5 to about 20 percent by weight of an ethylene/propylene random copolymer, said ethylene/propylene random copolymer having an ethylene content of about 7 percent by weight or less;
said polypropylene composition having a total ethylene content of about 1 percent by weight or less, and a decalin solubles content of about 6 percent by weight or less.

9. The non-woven fabric according to claim 8, wherein said ethylene/propylene random copolymer has an ethylene content of from about 2 to about 3 percent by weight.

10. The non-woven fabric according to claim 8, wherein said propylene homopolymer has a decalin solubles content of from about 2 to about 4 percent by weight.

11. The non-woven fabric according to claim 8, wherein said polypropylene composition has a melt flow index of from about 8 to about 55 dg/min at 230° C.

12. The non-woven fabric according to claim 11, wherein said polypropylene composition is visbroken from a material having a melt flow index of less than 12 dg/min at 230° C.

13. The non-woven fabric according to claim 8, wherein said polypropylene composition is produced by in-reactor blending.

14. The non-woven fabric according to claim 8, wherein said polypropylene composition is produced by melt blending a propylene homopolymer with an ethylene/propylene random copolymer.

15. A multilayer non-woven fabric construction comprising: at least one first layer comprising a spunbond web and at least one second layer comprising a meltblown web; said spunbond web comprising a polypropylene composition comprising from about 80 to about 95 percent by weight of a propylene homopolymer, said propylene homopolymer having a decalin solubles content of about 4 percent by weight or less; and from about 5 to about 20 percent by weight of an ethylene/propylene random copolymer having an ethylene content of about 7 percent by weight of the ethylene/propylene random copolymer or less; said polypropylene composition having a total ethylene content of about 1 percent by weight or less, and a decalin solubles content of about 6 percent by weight or less.

16. The multilayer non-woven fabric construction according to claim 15, wherein said ethylene/propylene random copolymer has an ethylene content of from about 2 to about 3 percent by weight.

17. The multilayer non-woven fabric construction according to claim 15, wherein said propylene homopolymer has an decalin solubles content of from about 2 to about 4 percent by weight.

18. The multilayer non-woven fabric construction according to claim 15, wherein said polypropylene composition has a melt flow index of from about 8 to about 55 dg/min at 230° C.

19. The multilayer non-woven fabric construction according to claim 18, wherein said polypropylene composition is visbroken from a material having a melt flow index of less than 12 dg/min at 230° C.

20. The multilayer non-woven fabric construction according to claim 15, wherein said polypropylene composition is produced by in-reactor blending.

21. The multilayer non-woven fabric construction according to claim 15, wherein said polypropylene composition is produced by melt blending a propylene homopolymer with an ethylene/propylene random copolymer.

22. The multilayer non-woven fabric construction according to claim 15, comprising a meltblown web sandwiched between two spunbond webs.

23. The multilayer non-woven fabric construction according to claim 15, wherein said at least one first web and said at least one second web are bonded by calendering.

24. A non-woven fabric comprising:
a polypropylene composition comprising from about 80 to about 95 percent by weight of a propylene homopolymer, said propylene homopolymer having a decalin solubles content of about 4 percent by weight or less; and
from about 5 to about 20 percent by weight of an ethylene/propylene random copolymer, said ethylene/propylene random copolymer having an ethylene content of about 7 percent by weight or less;
said polypropylene composition having a total ethylene content of about 1 percent by weight or less, and a decalin solubles content of about 6 percent by weight or less; and
wherein said fabric is produced using a bond temperature range of about 155° C. to about 162° C.

25. A polypropylene composition produced by in-reactor blending comprising:
from about 80 to about 95 percent by weight of a propylene homopolymer, said propylene homopolymer having a decalin solubles content of about 4 percent by weight or less; and
from about 5 to about 20 percent by weight of an ethylene/propylene random copolymer, said ethylene/propylene random copolymer having an ethylene content of about 7 percent by weight or less;
said propylene composition having a total ethylene content of about 1 percent by weight or less, and a decalin solubles content of about 6 percent by weight or less.

26. A non-woven fabric comprising:
a polypropylene composition produced by in-reactor blending comprising from about 80 to about 95 percent by weight of a propylene homopolymer, said propylene homopolymer having a decalin solubles content of about 4 percent by weight or less; and
from about 5 to about 20 percent by weight of an ethylene/propylene random copolymer, said ethylene/propylene random copolymer having an ethylene content of about 7 percent by weight or less;
said polypropylene composition having a total ethylene content of about 1 percent by weight or less, and a decalin solubles content of about 6 percent by weight or less; and
wherein said fabric has an MD tensile strength of at least 3000 g in the temperature range of about 155° C. to about 162° C.

* * * * *